US011138670B2

(12) United States Patent
Slater, Sr. et al.

(10) Patent No.: US 11,138,670 B2
(45) Date of Patent: Oct. 5, 2021

(54) SYSTEMS AND METHODS FOR VERIFYING INSURANCE INFORMATION

(71) Applicant: MNJ Tech LLC, Saint Charles, MO (US)

(72) Inventors: Michael E. Slater, Sr., Saint Charles, MO (US); Carl J. Andrews, Fenton, MO (US); Narendra Dukkipati, Dardenne Prairie, MO (US)

(73) Assignee: MNJ TECH LLC, Saint Charles, MO (US)

( * ) Notice: Subject to any disclaimer, the term of this patent is extended or adjusted under 35 U.S.C. 154(b) by 698 days.

(21) Appl. No.: 14/995,738

(22) Filed: Jan. 14, 2016

(65) Prior Publication Data
US 2017/0206607 A1 Jul. 20, 2017

(51) Int. Cl.
G06Q 40/08 (2012.01)
(52) U.S. Cl.
CPC .................... G06Q 40/08 (2013.01)
(58) Field of Classification Search
CPC ....................................... G06Q 40/08
See application file for complete search history.

(56) References Cited

U.S. PATENT DOCUMENTS

| 5,325,291 | A | 6/1994 | Garrett et al. |
| 6,233,563 | B1 | 5/2001 | Jefferson et al. |
| 8,373,554 | B2 | 2/2013 | Cai et al. |
| 8,543,424 | B2 | 9/2013 | Hunsaker et al. |
| 8,712,803 | B1* | 4/2014 | Buentello ............... G06Q 50/26 705/4 |
| 2004/0186749 | A1 | 9/2004 | Iwuagwu |
| 2005/0088320 | A1 | 4/2005 | Kovach |
| 2005/0283388 | A1* | 12/2005 | Eberwine ............... G06Q 40/08 705/4 |
| 2006/0085231 | A1* | 4/2006 | Brofman ............ G06Q 20/4037 705/4 |
| 2007/0024466 | A1 | 2/2007 | Grison |
| 2008/0027761 | A1* | 1/2008 | Bracha .................... G06Q 40/00 705/4 |
| 2013/0197945 | A1 | 8/2013 | Anderson |
| 2013/0290036 | A1* | 10/2013 | Strange .................. G06Q 40/08 705/4 |

(Continued)

FOREIGN PATENT DOCUMENTS

WO   WO-9503569 A3 *   3/1995   ............ G06Q 40/02

Primary Examiner — Bennett M Sigmond
Assistant Examiner — Xavier M. Bennett
(74) Attorney, Agent, or Firm — Armstrong Teasdale LLP

(57) ABSTRACT

An insurance verification system and methods for verifying insurance information are provided. The insurance verification system includes an insurance verification (IV) device. The IV computing device includes including a processor and a memory in communication with the processor. The processor is programmed to receive vehicle user information from a client device, generate an insurance information request including at least a portion of the vehicle user information, transmit the insurance information request to at least one insurance provider computing device, and receive a response from the insurance provider computing device. The response indicates whether or not an insurance profile associated with the vehicle user information is stored at the insurance provider computing device.

13 Claims, 5 Drawing Sheets

(56) References Cited

U.S. PATENT DOCUMENTS

| | | | |
|---|---|---|---|
| 2014/0039935 A1* | 2/2014 | Rivera | G06Q 40/08 705/4 |
| 2015/0120334 A1 | 4/2015 | Jones | |
| 2015/0215315 A1* | 7/2015 | Gordon | G06F 21/45 726/5 |
| 2017/0161435 A1* | 6/2017 | Orosco | G06F 16/86 |

* cited by examiner

SYSTEMS AND METHODS FOR VERIFYING INSURANCE INFORMATION

BACKGROUND

The field of the disclosure relates generally to insurance, and more specifically, to automated insurance verification.

Insurance is often used to reduce the costs a group or individual is responsible for in the event of damage, injury, theft, or preventative measures (e.g., an annual visit to a doctor). An insurance policy may be associated with, for example, at least one person, animal, or property (e.g., a building, a vehicle, land, etc.). Insurance providers offer insurance policies to customers for a variety of categories, including, but not limited to, health insurance, homeowner's insurance, renter's insurance, pet insurance, and vehicle insurance. Vehicle insurance may be legally required to own and/or operate a vehicle. Law enforcement and car rental agencies may request insurance information from a vehicle user (e.g., a driver, passenger, and/or owner of the vehicle) to verify that the vehicle or the vehicle user is associated with an active vehicle insurance policy. If the vehicle is not associated with an active insurance policy, law enforcement may issue a fine, or the car rental agency may not permit the vehicle user to rent a car.

Typically, the vehicle user has a physical insurance card that is presented to a verifying party (such as law enforcement, a car rental agency, another vehicle user, or a Department of Motor Vehicles). The physical insurance card includes information for identifying the insurance policy associated with the vehicle or vehicle user. The verifying party may communicate with an insurance provider associated with the insurance policy to determine if the insurance policy is active. In some systems, an agent of the insurance provider may manually process the request for insurance information from the verifying party.

However, a vehicle user may not always have the insurance card for verifying insurance information. For example, the insurance card may be lost, misplaced, or expired. Without the insurance card, the verifying party may not be able to access the insurance information. In addition, manufacturing new and replacement insurance cards may be a significant cost for the insurance provider. Manually processing the requests for insurance information with agents may also cost the insurance provider, and may be time-consuming for the agents.

BRIEF DESCRIPTION

In one aspect, an insurance verification system is provided. The insurance verification system includes an insurance verification (IV) device. The IV computing device includes including a processor and a memory in communication with the processor. The processor is programmed to receive vehicle user information from a client device, generate an insurance information request including at least a portion of the vehicle user information, transmit the insurance information request to at least one insurance provider computing device, and receive a response from the insurance provider computing device. The response indicates whether or not an insurance profile associated with the vehicle user information is stored at the insurance provider computing device.

In another aspect, a method for verifying insurance information is provided. The method may be implemented using an IV computing device. The method includes receiving vehicle user information from a client device, generating an insurance information request including at least a portion of the vehicle user information, transmitting the insurance information request to at least one insurance provider computing device, and receiving a response from the insurance provider computing device. The response indicates whether or not an insurance profile associated with the vehicle user information is stored at the insurance provider computing device.

In yet another aspect, at least one non-transitory computer-readable storage media having computer-executable instructions embodied thereon for verifying insurance information is provided. The instructions, when executed by a processor, cause the processor to receive vehicle user information from a client device, generate an insurance information request including at least a portion of the vehicle user information, transmit the insurance information request to at least one insurance provider computing device, and receive a response from the at least one insurance provider computing device. The response indicates whether or not an insurance profile associated with the vehicle user information is stored at the insurance provider computing device.

DETAILED DESCRIPTION

The field of the disclosure relates generally to insurance, and more specifically, to automated insurance verification. The systems and methods described herein are configured to receive vehicle user information such as a driver's license number or a vehicle identification number (VIN) from a client device (e.g., a mobile device) and automatically identify an associated insurance provider. The vehicle user information is formatted into an insurance information request based on a template associated with the insurance provider. The request is sent to the insurance provider to retrieve insurance information from the insurance provider and provide the insurance information to the client device for display.

As used herein, "insurance information" is information associated with an insurance policy and a policy holder. For example, the insurance information may include a policy holder address, a policy holder name, an insurance provider associated with the insurance policy (e.g., name and/or address of the insurance provider), an effective or beginning date, and an expiration date. For vehicle insurance, the insurance information may also include information about the vehicle, such as a year, make, model, color, vehicle identification number (VIN), license plate number, and an insurance provider identifier. The above examples are examples only, and are thus not intended to limit in any way the definition and/or meaning of the term "insurance information".

The systems and methods described herein facilitate verifying vehicle insurance. However, it is to be understood that the systems and methods may be used to verify other types of insurance, such as health insurance, homeowner's insurance, renter's insurance, and pet insurance.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

Figure 1:
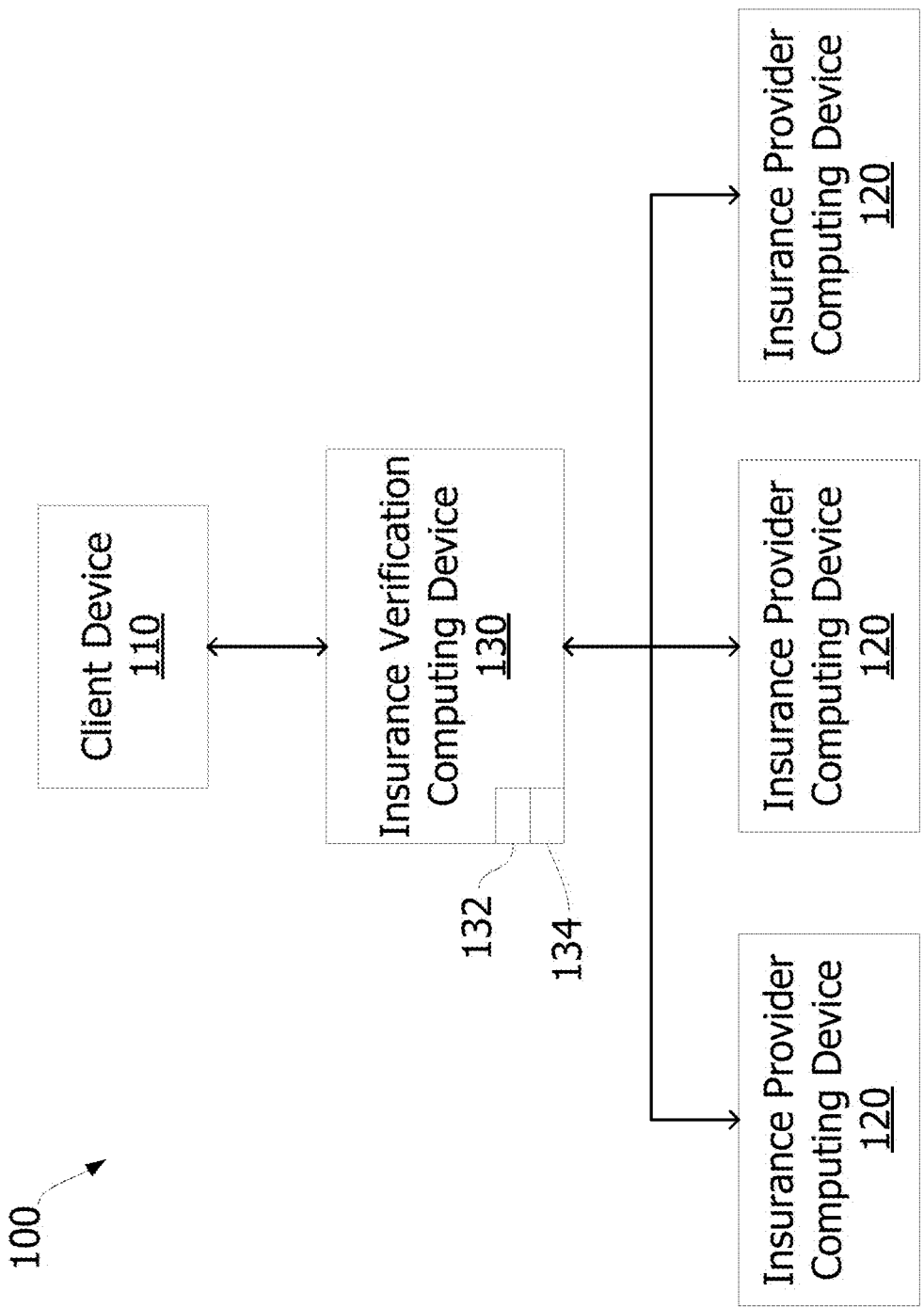
FIG. 1 depicts an example insurance verification system.

FIG. 1 illustrates an exemplary insurance verification system 100. In the example embodiment, system 100 includes a client device 110, one or more insurance provider computing devices 120, and an insurance verification (IV) device 130. In other embodiments, system 100 may include additional, fewer, or alternative components and functions, including those described elsewhere herein.

In the example embodiment, client device 110 is a computing device associated with a verifying party. The verifying party may include, for example, law enforcement, car rental agencies, a Department of Motor Vehicles (DMV), and other parties that verify insurance information. In certain embodiments, the verifying party may include a vehicle user (e.g., a driver, passenger, or owner of a vehicle). In the example embodiment, client device 110 is a mobile computing device (e.g., laptop, smartphone, tablet, PDA vehicle-integrated computing device, wearable electronic, etc.), including a remote computing device as described further herein. In other embodiments, client device 110 is a different type of computing device, such as a desktop computer. In at least some embodiments, client device 110 may be in communication with a computing device associated with a verifying party. For example, client device 110 may be a host computing device as described herein hosting a web service that is accessible by the verifying party.

Client device 110 is configured to receive input from the verifying party requesting insurance information. In the example embodiment, the verifying party requests insurance information associated with a vehicle or a vehicle user. The input from the verifying party includes vehicle user information. The vehicle user information may include, but is not limited to, a driver's license number, a license plate number, a VIN, an insurance identifier (e.g., an account number of the vehicle user, a name of an insurance provider), a biometric input, and/or a unique code associated with the vehicle or the vehicle user. Client device 110 is further configured to transmit the vehicle user information to IV computing device 130 for processing and receive the insurance information associated with the vehicle or the vehicle user from IV computing device 130. Client device 110 presents the insurance information to the verifying party.

In at least some embodiments, client device 110 has an application programming interface (API) stored in memory (not shown in FIG. 1) associated with IV computing device 130. The API facilitates receiving input from the verifying party, transmitting the vehicle user information, receiving the insurance information, and presenting the insurance information to the verifying party. For example, the API may prompt the verifying party for the vehicle user information. In another example, the API may include a user interface for displaying the insurance information. Additionally or alternatively, client device 110 may access a web service to provide the above features. In such an embodiment, client device 110 may be in communication with one or more remote computing devices (not shown) that host the web service.

In the example embodiment, system 100 includes three insurance provider computing devices 120. In other embodiments, system 100 includes a different number of insurance provider computing devices 120 (including one). Each insurance provider computing device 120 is associated with an insurance provider. In one embodiment, each insurance provider computing device 120 is associated with a different insurance provider. In the example embodiment, insurance provider computing devices 120 are configured to store a plurality of insurance profiles. Alternatively, at least some insurance provider computing devices 120 may be in communication with an external database including the insurance profiles. The insurance profiles are associated with policy holders and insurance policies of the insurance provider. Each insurance profile includes insurance information associated with an insurance policy and a policy holder. Each insurance provider computing device 120 is further configured to search the stored insurance profiles and locate an insurance profile that corresponds to a request received from IV computing device 130 as described herein.

In the example embodiment, IV computing device 130 is in communication with client device 110 and insurance provider computing devices 120. Communication between client device 110, insurance provider computing devices 120, and IV computing device 130 may be encrypted to secure communication of vehicle user information and insurance information. IV computing device 130 includes one or more processors 132 and a memory device 134 in communication with processors 132. IV computing device 130 is configured to: (i) receive the vehicle user information, (ii) determine whether or not one or more of insurance provider computing device 120 store an insurance profile associated with the vehicle user information, (iii) retrieve the insurance information from the insurance provider computing devices 120, and (iv) transmit the insurance information to client device 110. IV computing device 130 enables the verifying party to access the insurance information without a physical insurance card and without requiring the insurance provider to manually process the request.

In the example embodiment, IV computing device 130 is configured to receive vehicle user information from client device 110 to initiate a request for the insurance information. IV computing device 130 is further configured to parse the vehicle user information to generate an insurance information request including at least a portion of the vehicle user information. The insurance information request is transmitted to one or more insurance provider computing devices 120 to identify one or more insurance profiles associated with the vehicle user information.

In at least some embodiments, IV computing device 130 populate a request template with at least a portion of the parsed vehicle user information to generate the insurance information request. Formatting the vehicle user information based on the request template enables insurance provider computing devices 120 to use the vehicle user information to identify a corresponding insurance profile. In certain embodiments, at least some of insurance provider computing devices 120 may have a unique request template associated with the insurance provider. The request templates may be stored at IV computing device 130. Additionally or alternatively, IV computing device 130 may retrieve the request templates from a remote computing device (e.g., insurance provider computing devices 120).

In some embodiments, IV computing device 130 is further configured to identify an insurance provider associated with the vehicle user information based on the vehicle user information. For example, client device 110 may prompt the verifying party to identify the insurance provider. In one embodiment, the vehicle user information is sent to IV computing device 130 including an identifier of the insurance provider. IV computing device 130 formats the vehicle user information based on the insurance provider into an insurance information request. IV computing device 130 transmits the insurance information request to an insurance provider computing device 120 associated with the insurance provider.

Insurance provider computing device 120 is configured to receive the insurance information request, parse the vehicle user information from the insurance information request, and search through the stored insurance profiles for an insurance profile that is associated with the vehicle user information. If the associated insurance profile is found, insurance provider computing device 120 may transmit a response or notification to the IV computing device 130 indicating that the associated insurance profile has been found. IV computing device 130 may retrieve at least the insurance information of the associated insurance profile. In the example embodiment, insurance provider computing device 120 transmits at least the insurance information of the associated insurance profile with the response to IV computing device 130. In one embodiment, insurance provider computing device 120 transmits the insurance profile to IV computing device 130.

In certain embodiments, IV computing device 130 is configured to transmit the insurance information request to each insurance provider computing device 120. In such embodiments, IV computing device 130 may not be able to identify an insurance provider from the vehicle user information. The insurance information request may include a reduced portion of the vehicle user information to avoid conflicting request formats and submitting potentially sensitive information from the vehicle user information to every insurance provider. Insurance provider computing devices 120 are configured to search their respective stored insurance profiles for one or more insurance profiles that may potentially be associated with insurance information request. Each insurance provider computing device 120 with a potentially associated insurance profile transmits a notification to IV computing device indicating the potentially associated insurance profile is stored at each respective insurance provider computing device 120. In the example embodiment, each notification includes the insurance information from the corresponding insurance profile.

In at least some embodiments, insurance provider computing devices 120 are configured to determine whether or not an insurance information request is valid. For example, one or more insurance provider computing devices 120 may determine that the insurance information request is missing required data or the insurance information request has a formatting error. If the insurance information request is determined to be invalid, insurance provider computing devices 120 are configured to transmit an error message to IV computing device 130. The error message may indicate a reason the insurance information request is invalid. In one embodiment, IV computing device 130 is configured to identify the reason and automatically adjust the insurance information request based on the error message. For example, IV computing device 130 may correct a formatting error within the insurance information request. IV computing device 130 transmits the adjusted information request to the insurance provider computing device 120 to be processed. IV computing device 130 may adjust a request template associated with insurance provider computing device 120 in response to the error message to prevent future errors. However, in certain embodiments, IV computing device 130 may not be configured to overcome every error. In such an embodiment, IV computing device 130 may notify client device 110, an administrator associated with IV computing device 130, and/or insurance provider computing devices 120 of the error message.

Upon receiving the insurance information, IV computing device 130 may be configured to parse and/or format the insurance information. In certain embodiments in which IV computing device 130 receives a plurality of notifications with insurance information, IV computing device 130 may be configured to determine which insurance information is presently associated with the vehicle user information. For example, IV computing device 130 may compare the vehicle user information to the insurance information. IV computing device 130 may also identify any expired insurance information. Once IV computing device 130 has one remaining notification with insurance information, IV computing device 130 transmits the insurance information to client device 110. In other embodiments, if the notification does not include all of the insurance information, IV computing device 130 transmits another insurance information request to insurance provider computing device 120 associated with the notification to retrieve the insurance information.

IV computing device 130 is configured to transmit the insurance information to client device 110. Client device 110 is configured to present the insurance information to the verifying party. In the example embodiment, when IV computing device 130 receives a plurality of notifications with insurance information in response to the insurance information request, IV computing device 130 is configured to transmit each of the plurality of notifications to client device 110 to enable the verifying party to determine which insurance information applies to the vehicle user information. Client device 110 may transmit a message in response to the insurance information confirming the insurance information has been transmitted. In the example embodiment, the insurance information is stored at IV computing device 130 temporarily until receiving confirmation that the insurance information has been received. Temporarily storing the insurance information prevents security breaches from accessing previously stored insurance information (such as within a local database of insurance information) and enables client device 110 to access current or up-to-date insurance information from the insurance providers.

Figure 2:
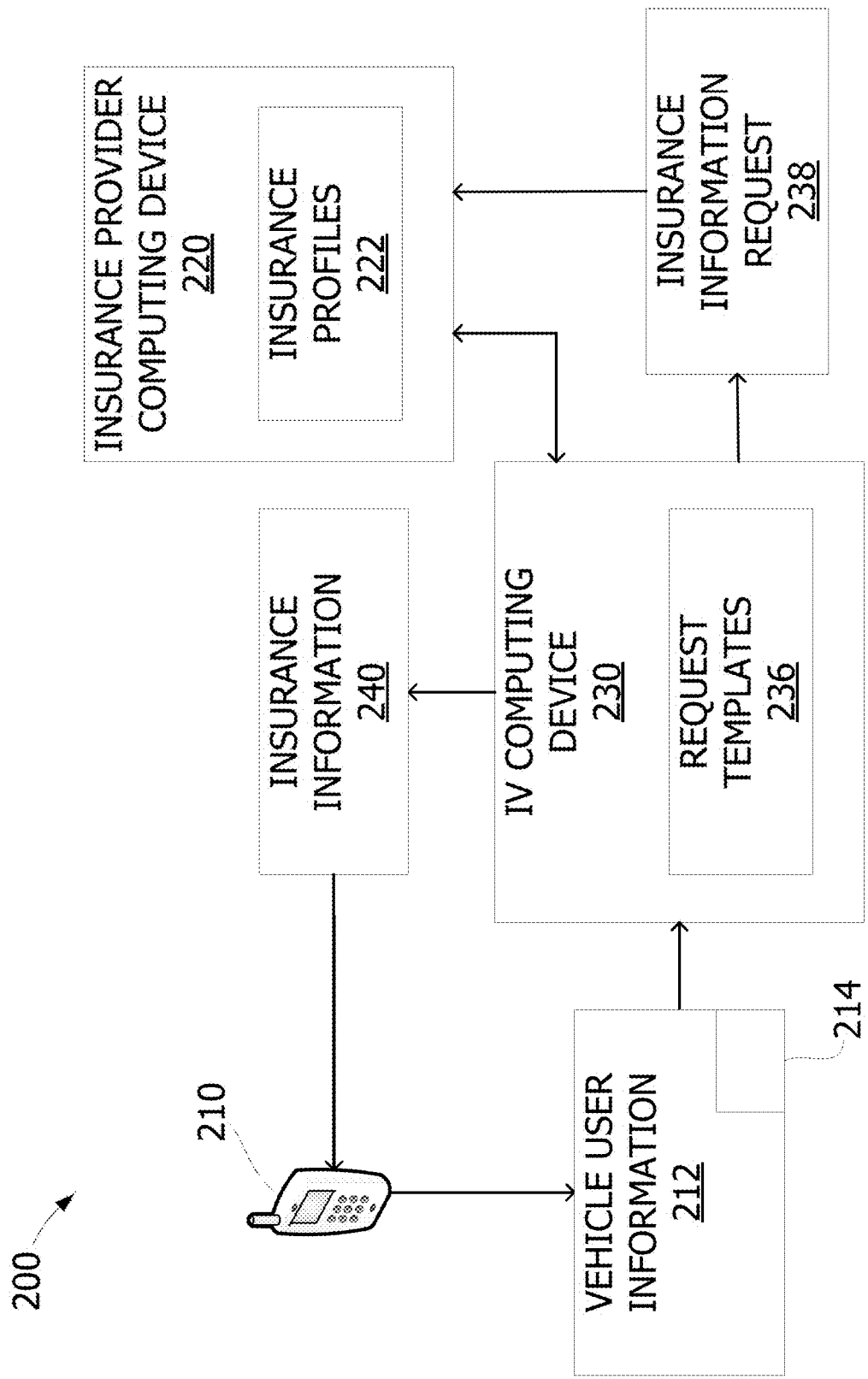
FIG. 2 depicts another example insurance verification system.

FIG. 2 depicts another example insurance verification system 200. System 200 is similar to system 100 shown in FIG. 1 and, in the absence of contrary representation, includes similar features and components. In the example embodiment, system 200 includes a client device 210, an insurance provider computing devices 220, and an IV computing device 230.

In the example embodiment, client device 210 is a mobile device associated with a verifying party. Client device 210 is configured to receive vehicle user information 212 from the verifying party. In some embodiments, client device 210 is configured to store vehicle user information 212. Client device 210 may prompt the verifying party to enter specific vehicle user information 212. For example, client device 210 may prompt the verifying party to enter a driver's license number. In the illustrated embodiment, vehicle user information 212 includes an insurance provider identifier 214. Insurance provider identifier 214 indicates an insurance provider associated with vehicle user information 212. Insurance provider identifier 214 may include, but it not limited to, a name of the insurance provider, an address, an internet protocol (IP) address, and/or a unique code associated with the insurance provider. In some embodiments, insurance provider identifier 214 may also indicate a specific insurance provider computing device 220 associated with the insurance provider. Client device 210 may prompt the verifying party to indicate the insurance provider associated with vehicle user information 212. For example, client device 210 may present a selectable menu of insurance providers to the verifying party. Client device 210 is further configured to transmit vehicle user information 212 to IV computing device 230.

In the example embodiment, IV computing device 230 receives vehicle user information 212 from client device 210. IV computing device 230 is configured to detect any insurance provider identifiers 214 and retrieve a request template 236 associated with the insurance provider for a plurality of stored request templates 236. In the example embodiment, IV computing device 230 stores request templates 236. Alternatively, request templates 236 may be stored in an external database (not shown) in communication with IV computing device 230. IV computing device 230 is configured to parse and format vehicle user information 212 to populate the retrieved request template 236. In the example embodiment, each request template 236 includes one or more parameters that are populated with vehicle user information 212. For example, a request template 236 may include a first parameter for a driver's license number and a second parameter for a VIN. Based on the populated request template 236, IV computing device 230 is configured to generate an insurance information request 238 and transmit insurance information request 238 to insurance provider computing device 220. In the example embodiment, insurance information request 238 is the populated request template 236.

Once insurance provider computing device 220 receives insurance information request 238 from IV computing device 230, insurance provider computing device 220 is configure to compare insurance information request 238 to a plurality of stored insurance profiles 222. In some embodiments, insurance profiles 222 are stored within an external database (not shown) in communication with insurance provider computing device 220. In the example embodiment, each insurance profile 222 includes insurance information 240 associated with an automobile or vehicle insurance policy. In other embodiments, insurance information 240 of insurance profiles 222 is associated with one or more different insurance policies (e.g., health, dental, homeowner's, renter's pet, etc.). Table 1 depicts example insurance information 240 that may be included in insurance profiles 222.

TABLE 1

| Insured Name | Insured Address | Insurance Provider | Expiration Date | Vehicle(s) (Year Make Model) |
|---|---|---|---|---|
| Joe Driver | 1 No Fault Drive, O'Fallon, MO | Company A | Jun. 1, 2015 | 2005 ACUR MDX 2013 MRCD E350 |
| Jane Smith | 28 14$^{th}$ Street, Syracuse, NY | Company B | Nov. 12, 2016 | 2006 NISS MAXIMA |

Insurance provider computing device 220 is configured to identify one or more insurance profiles 222 that are associated with vehicle user information 212 based on insurance information request 238. In the example embodiment, insurance provider computing device 220 is configured to identify matching parameters from insurance profiles 222 and insurance information request 238. For example, insurance provider computing device 220 identifies an insurance profile 222 that includes a VIN that matches a VIN from insurance information request 238. Insurance provider computing device 220 is further configured to transmit insurance information 240 from the identified insurance profiles 222 to IV computing device 230. In certain embodiments, insurance provider computing device 220 may transmit the identified insurance profiles 222. IV computing device 230 receives insurance information 240 and transmits insurance information 240 to client device 210 to be presented to the verifying party.

Figure 3:
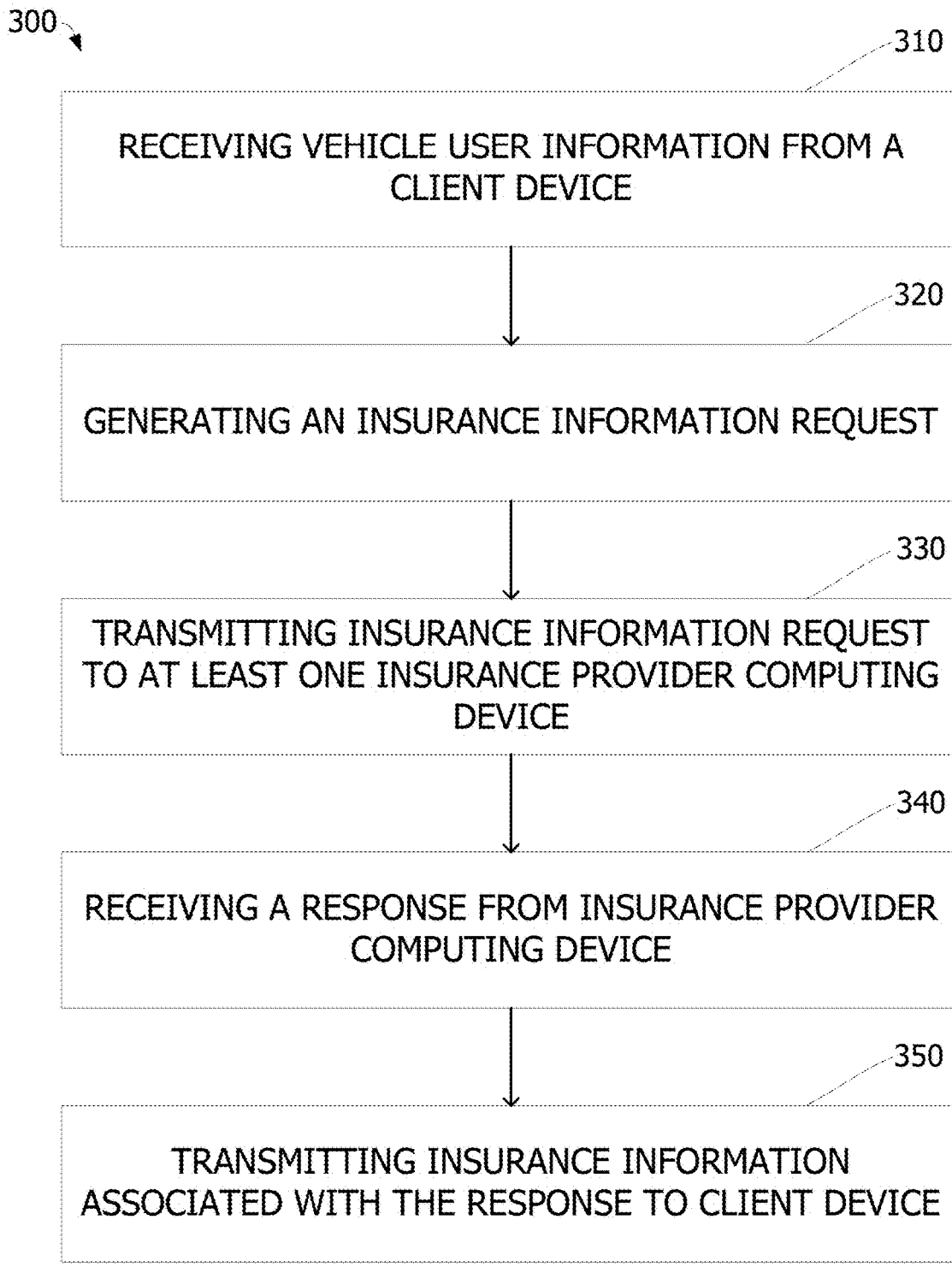
FIG. 3 is a flow diagram of an example method for verifying insurance that may be used with the system shown in FIG. 1.

FIG. 3 depicts a flow diagram of an example method 300 for verifying insurance information using an insurance verification system, such as system 100 shown in FIG. 1. In the example embodiment, method 300 is performed by an IV computing device (e.g., IV computing device 130, shown in FIG. 1). In other embodiments, method 300 or steps of method 300 may be performed by a different computing device, such as a client device or insurance provider computing device. In at least some embodiments, method 300 may include additional, fewer, or alternative steps to verify insurance information.

Method 300 begins with the IV computing device receiving 310 vehicle user information from a client device. The IV computing device parses the vehicle user information to generate 320 an insurance information request. In one embodiment, the IV computing device identifies an insurance provider associated with the vehicle user information and retrieves a request template associated with the insurance provider. In one embodiment, the IV computing device inserts at least a portion of the vehicle user information into the request template to generate 320 the insurance information request. The IV computing device transmits 330 the insurance information request to at least one insurance provider computing device to identify an insurance profile associated with the vehicle user information. In some embodiments, the IV computing device transmits 330 the insurance information request to a plurality of insurance provider computing devices if the IV computing device does not determine the insurance provider from the vehicle user information.

The insurance provider computing devices that receive the insurance information request are configured to search through their respective stored insurance profiles to find a matching or associated insurance profile based on the insurance information request. The IV computing device receives 340 a response from one or more insurance provider computing devices indicating that the insurance provider computing device has a stored insurance profile that matches or is associated with the vehicle user information. In at least some embodiments, the response includes insurance information from the matching insurance profiles. In other embodiments, the IV computing device requests or retrieves the insurance information from the insurance provider computing device. In certain embodiments, the IV computing device may determine which response is presently associated with the vehicle user information. In the example embodiment, the IV computing device then transmits 350 the insurance information associated with the vehicle user information to the client device. The client device presents the insurance information to a verifying party to verify a vehicle user's insurance information.

In one example, a law enforcement officer stops a vehicle user in a vehicle for a traffic violation. In at least some known systems, the vehicle user presents a physical insurance card to the officer. The officer communicates information from the insurance card to an insurance provider to verify an active insurance policy is associated with the vehicle. In the example embodiment, the vehicle user provides the officer with vehicle user information, such as a VIN. The officer inputs the vehicle user information into a computing device (i.e., a client device). The vehicle user information is processed by an IV computing device and sent to one or more insurance provider computing devices. The IV computing device receives one or more responses that indicate (or include) insurance information associated with the vehicle user information. The IV computing device transmits the insurance information to the computing device such that the officer is able to view the insurance information and determine whether or not the vehicle is associated with an active insurance policy.

In another example, a vehicle user visits a DMV for a driver's license renewal. The DMV may require that the vehicle user is associated with an active insurance policy before renewing the user's license. The DMV transmits the vehicle user's driver's license number to an IV computing device and receives insurance information associated with the driver's license number in response. The insurance information includes an effective date (i.e., a beginning date) and an expiration data from an insurance policy associated with the vehicle user. Based on the insurance information, the DMV determines whether or not to renew the vehicle user's license.

In yet another example, two vehicle users are involved in a collision between two vehicles. Each vehicle user inputs vehicle user information into a computing device (e.g., a smart phone) to retrieve the insurance information. The vehicle users then exchange the retrieved insurance information for assessing liability and insurance coverage for the collision. In a further example, a vehicle user may use the insurance verification system to retrieve the insurance information to fill out insurance forms or track expiration dates.

Figure 4:
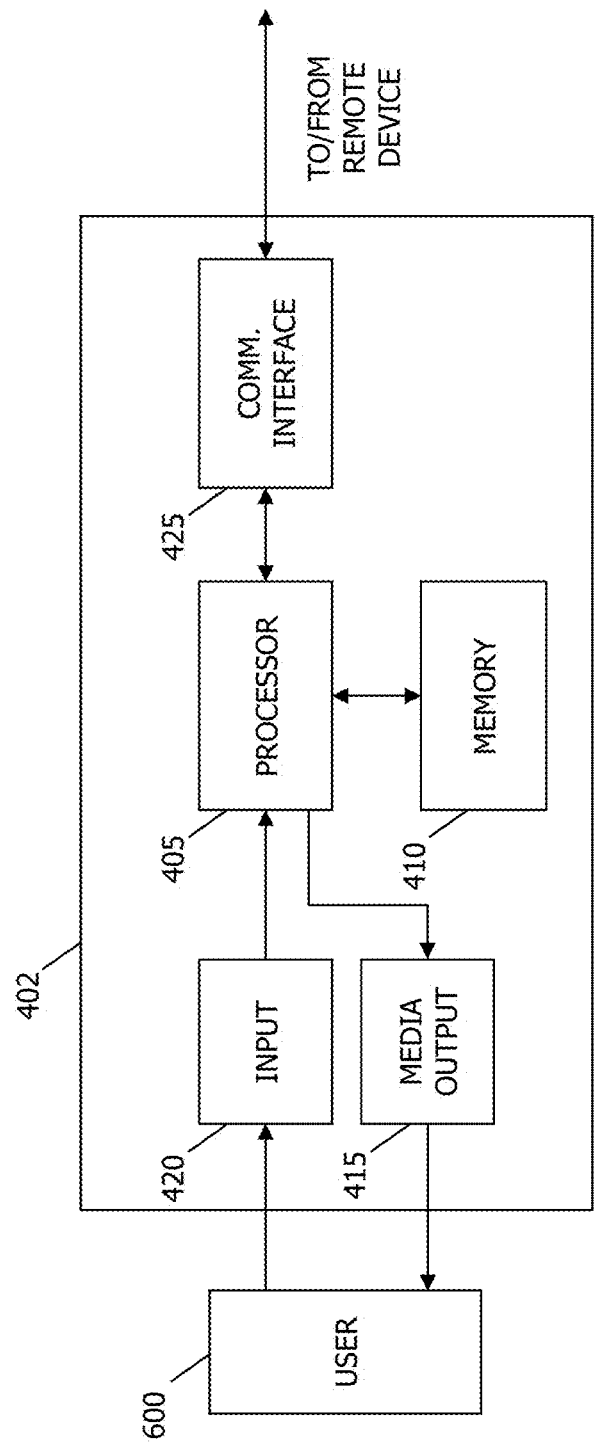
FIG. 4 is an exemplary remote computing device that may be used in the system shown in FIG. 1.

FIG. 4 depicts an exemplary configuration of a user or remote computing device 402. Computing device 402 may include, but is not limited to, client devices 110, 220, insurance provider computing devices 120, 220, and/or IV computing devices 130, 230 shown in FIGS. 1 and 2.

Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 600. Media output component 415 may be any component capable of conveying information to user 600. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 600. The interactive user interface may include, for example, a reality augmentation interface for requesting and viewing Enhanced Situation Visualization.

In some embodiments, computing device 402 may include an input device 420 for receiving input from user 600. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device such as insurance provider computing device 120 (shown in FIG. 1). Communication interface 425 may include, for example, a wired or wireless network adapter or a wireless data transceiver for use with a mobile phone network (e.g., Global System for Mobile communications (GSM), 3G, 4G or BLUETOOTH® (i.e., short-wave UHF radio wave communications)) or other mobile data network (e.g., Worldwide interoperability for Microwave Access (WIMAX)).

Stored in memory area 410 are, for example, computer-readable instructions for providing a user interface to user 600 via media output component 415 and, optionally, receiving and processing input from input device 420. A user interface may include, among other possibilities, a web browser and client application. Web browsers enable users 600 to display and interact with media and other information typically embedded on a web page or a website from a web server associated with a merchant. A client application allows users 600 to interact with a server application associated with, for example, a vendor or business.

Figure 5:
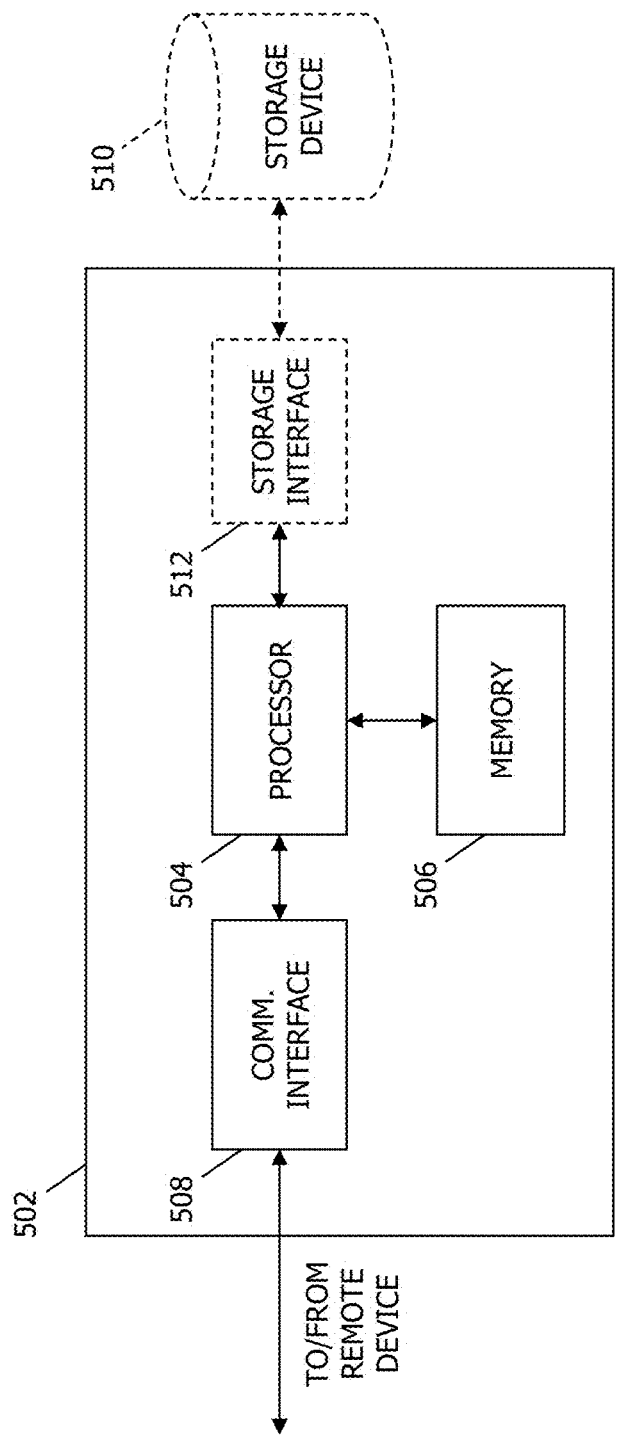
FIG. 5 is an exemplary host computing device that may be used in the system shown in FIG. 1.

FIG. 5 depicts an exemplary configuration of a host computing device 502. Host computing device 502 may be representative of client devices 110, 220, insurance provider computing devices 120, 220, and/or IV computing devices 130, 230 shown in FIGS. 1 and 2. Host computing device 502 may include a processor 504 for executing instructions. Instructions may be stored in a memory area 506, for example. Processor 504 may include one or more processing units (e.g., in a multi-core configuration).

Processor 504 may be operatively coupled to a communication interface 508 such that host computing device 502 may be capable of communicating with a remote device such as computing device 402 shown in FIG. 4 or another host computing device 502. For example, communication interface 508 may receive requests from user computing device 402 via the Internet.

Processor 504 may also be operatively coupled to a storage device 510. Storage device 510 may be any computer-operated hardware suitable for storing and/or retrieving data. In some embodiments, storage device 510 may be integrated in host computing device 502. For example, host computing device 502 may include one or more hard disk drives as storage device 510. In other embodiments, storage device 510 may be external to host computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 may be operatively coupled to storage device 510 via a storage interface 512.

Storage interface 512 may be any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The systems and methods described above enable vehicle users to present insurance information without requiring the vehicle user to have a physical insurance card present. Removing insurance cards may facilitate reduced manufacturing costs and costs associated with processing manual requests for insurance information. The systems may be coupled to a plurality of computing devices associated with different insurance providers, enabling a verifying party to verify insurance information for an increased number of vehicle users. Moreover, the systems and methods are configured to enable different verifying parties (e.g., law enforcement, car rental agency, DMV, vehicle users) to access the insurance information in near real-time. For example, the systems described above may provide insurance information within approximately five to ten seconds of submitting a request. An IV computing device does not maintain a local database of insurance information or vehicle user information, but rather provides up-to-date insurance information from the insurance provider through a secure connection to prevent security breaches.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insurance verification system comprising:
 an insurance verification (IV) computing device including a processor and a memory in communication with the processor, the IV computing device communicatively coupled between a client device and a plurality of insurance provider computing devices, the processor programmed to:

store a plurality of unique request templates, each unique request template associated with a different insurance provider, and each unique request template including a first parameter corresponding to a driver's license number and a second parameter corresponding to a vehicle identification number (VIN);

receive vehicle user information input on the client device via an application programming interface (API) associated with the IV computing device, the vehicle user information including an insurance provider identifier;

retrieve, from the plurality of stored unique request templates, a unique request template for an insurance provider that is associated with the insurance provider identifier;

generate an insurance information request including a reduced portion of the vehicle user information to avoid transmitting potentially sensitive information of the received vehicle user information to the insurance provider by:
  generating the reduced portion of the vehicle user information by parsing the vehicle user information to determine at least a driver's license number and a vehicle identification number; and
  populating the retrieved unique request template with the reduced portion, wherein (i) the respective first parameter of the retrieved unique request template is populated with the parsed driver's license number and (ii) the respective second parameter of the retrieved unique request template is populated with the parsed vehicle identification number;

transmit the insurance information request including the populated unique request template to at least one insurance provider computing device of the plurality of insurance provider computing devices;

receive an error message from the at least one insurance provider computing device in response to the insurance information request, the error message indicating a formatting error in the insurance information request;

automatically adjust the insurance information request based on the error message;

transmit the adjusted insurance information request to the at least one insurance provider computing device;

automatically adjust a request template associated with the insurance information request based on the error message;

store the adjusted request template in the memory to prevent future errors;

receive a response from the at least one insurance provider computing device, wherein the response indicates whether or not an insurance profile associated with the vehicle user information is stored at the at least one insurance provider computing device; and transmit the response to the client device via the API within ten seconds of receiving the vehicle user information from the client device.

2. The insurance verification system of claim 1, wherein the IV computing device is in communication with a plurality of insurance provider computing devices, each insurance provider computing device associated with a different insurance provider, and wherein the processor is further programmed to:
  transmit insurance information requests to each insurance provider computing device.

3. The insurance verification system of claim 2, wherein the processor is further programmed to:
  receive a first notification from a first insurance provider computing device associated with a first insurance provider;
  receive a second notification from a second insurance provider computing device associated with a second insurance provider, the first and second notifications both indicating that an insurance profile associated with the vehicle user information is stored on the respective insurance provider computing device; and
  transmit the first and second notifications to the client device.

4. The insurance verification system of claim 1, wherein the processor is further programmed to:
  retrieve the associated insurance profile from the at least one insurance provider computing device; and
  transmit at least a portion of the associated insurance profile to the client device.

5. A method for verifying insurance information, said method comprising:
  storing a plurality of unique request templates, each unique request template associated with a different insurance provider, and each unique request template including a first parameter corresponding to a driver's license number and a second parameter corresponding to a vehicle identification number (VIN);
  receiving, at an insurance verification (IV) computing device, vehicle user information input on a client device via an application programming interface (API) associated with the IV computing device, the vehicle user information including an insurance provider identifier, the insurance verification (IV) computing device communicatively coupled between the client device and a plurality of insurance provider computing devices;
  retrieving, from the plurality of stored unique request templates, a unique request template for an insurance provider that is associated with the insurance provider identifier;
  generating, at the IV computing device, an insurance information request including a reduced portion of the vehicle user information to avoid transmitting potentially sensitive information of the received vehicle user information to the insurance provider by:
    generating the reduced portion of the vehicle user information by parsing the vehicle user information to determine at least a driver's license number and a vehicle identification number; and
    populating the retrieved unique request template with the reduced portion, wherein (i) the respective first parameter of the retrieved unique request template is populated with the parsed driver's license number and (ii) the respective second parameter of the retrieved unique request template is populated with the parsed vehicle identification number;
  transmitting the insurance information request including the populated unique request template to at least one insurance provider computing device of the plurality of insurance provider computing devices;
  receiving an error message from the at least one insurance provider computing device in response to the insurance information request, the error message indicating a formatting error in the insurance information request
  automatically adjusting the insurance information request based on the error message;

transmitting the adjusted insurance information request to the at least one insurance provider computing device;
automatically adjusting a request template associated with the insurance information request based on the error message;
storing the adjusted request template in the memory to prevent future errors;
receiving, at the IV computing device, a response from the at least one insurance provider computing device, wherein the response indicates whether or not an insurance profile associated with the vehicle user information is stored at the at least one insurance provider computing device; and
transmitting the response to the client device via the API within ten seconds of receiving the vehicle user information from the client device.

6. The method of claim 5, further comprising:
transmitting insurance information requests to a plurality of insurance provider computing devices, each insurance provider computing device associated with a different insurance provider.

7. The method of claim 6, wherein receiving a response from the at least one insurance provider computing device further comprises:
receiving, at the IV computing device, a first notification from a first insurance provider computing device associated with a first insurance provider;
receiving a second notification from a second insurance provider computing device associated with a second insurance provider, the first and second notifications both indicating that an insurance profile associated with the vehicle user information is stored on the respective insurance provider computing device; and
transmitting, from the IV computing device, the first and second notifications to the client device.

8. The method of claim 5 further comprising:
retrieving the associated insurance profile from the at least one insurance provider computing device; and
transmitting at least a portion of the associated insurance profile to the client device.

9. At least one non-transitory computer-readable storage media having computer-executable instructions embodied thereon for verifying insurance information, wherein said instructions, when executed by a processor of an insurance verification (IV) computing device, cause the processor to:
store a plurality of unique request templates, each unique request template associated with a different insurance provider, and each unique request template including a first parameter corresponding to a driver's license number and a second parameter corresponding to a vehicle identification number (VIN);
receive vehicle user information input on a client device via an application programming interface (API) associated with the IV computing device, the vehicle user information including an insurance provider identifier, the IV computing device communicatively coupled between the client device and a plurality of insurance provider computing devices;
retrieve, from the plurality of stored unique request templates, a unique request template for an insurance provider that is associated with the insurance provider identifier;
generate an insurance information request including a reduced portion of the vehicle user information to avoid transmitting potentially sensitive information of the received vehicle user information to the insurance provider by:

generating the reduced portion of the vehicle user information by parsing the vehicle user information to determine at least a driver's license number and a vehicle identification number; and
populating the retrieved unique request template with the reduced portion, wherein (i) the respective first parameter of the retrieved unique request template is populated with the parsed driver's license number and (ii) the respective second parameter of the retrieved unique request template is populated with the parsed vehicle identification number;
transmit the insurance information request including the populated unique request template to at least one insurance provider computing device of the plurality of insurance provider computing devices;
receive an error message from the at least one insurance provider computing device in response to the insurance information request, the error message indicating a formatting error in the insurance information request
automatically adjust the insurance information request based on the error message;
transmit the adjusted insurance information request to the at least one insurance provider computing device;
automatically adjust a request template associated with the insurance information request based on the error message;
store the adjusted request template in the memory to prevent future errors;
receive a response from the at least one insurance provider computing device, wherein the response indicates whether or not an insurance profile associated with the vehicle user information is stored at the at least one insurance provider computing device; and
transmit the response to the client device via the API within ten seconds of receiving the vehicle user information from the client device.

10. The computer-readable storage media of claim 9, wherein the computer-executable instructions further cause the processor to:
transmit insurance information requests to a plurality of insurance provider computing devices, each insurance provider computing device associated with a different insurance provider.

11. The computer-readable storage media of claim 10, wherein the computer-executable instructions further cause the processor to:
receive a first notification from a first insurance provider computing device associated with a first insurance provider;
receive a second notification from a second insurance provider computing device associated with a second insurance provider, the first and second notifications both indicating that an insurance profile associated with the vehicle user information is stored on the respective insurance provider computing device; and
transmit the first and second notifications to the client device.

12. The computer-readable storage media of claim 9, wherein the computer-executable instructions further cause the processor to:
retrieve the associated insurance profile from the at least one insurance provider computing device; and
transmit at least a portion of the associated insurance profile to the client device.

13. The insurance verification system of claim 1, wherein the processor is further programmed to prompt, via the API associated with the client device, the user to identify and input, on the client device, the insurance provider associated with the vehicle user information.

\* \* \* \* \*